(12) United States Patent
Teng

(10) Patent No.: US 9,025,947 B1
(45) Date of Patent: May 5, 2015

(54) ACTUATOR

(71) Applicant: Primax Electronics Ltd., Neihu, Taipei (TW)

(72) Inventor: Wei-Chih Teng, Taipei (TW)

(73) Assignee: Primax Electronics Ltd., Neihu (TW)

( * ) Notice: Subject to any disclaimer, the term of this patent is extended or adjusted under 35 U.S.C. 154(b) by 0 days.

(21) Appl. No.: 14/225,005

(22) Filed: Mar. 25, 2014

(30) Foreign Application Priority Data

Jan. 28, 2014 (TW) .............................. 103201767 U

(51) Int. Cl.
*G03B 3/10* (2006.01)
*G03B 13/34* (2006.01)

(52) U.S. Cl.
CPC ...................................... *G03B 13/34* (2013.01)

(58) Field of Classification Search
USPC ........................................................ 396/133
See application file for complete search history.

(56) References Cited

U.S. PATENT DOCUMENTS

| | | | |
|---|---|---|---|
| 2009/0316284 A1* | 12/2009 | Kim et al. ...................... | 359/824 |
| 2012/0039590 A1* | 2/2012 | Jacobsen et al. .............. | 396/133 |
| 2013/0128360 A1* | 5/2013 | Minamisawa et al. ........ | 359/554 |

* cited by examiner

*Primary Examiner* — Clayton E Laballe
*Assistant Examiner* — Dennis Hancock
(74) *Attorney, Agent, or Firm* — Kirton McConkie; Evan R. Witt

(57) ABSTRACT

An actuator is provided for driving a camera module to perform a focusing operation. The actuator includes a carrier part, a base, a driving module, and plural balls. The carrier part is used for supporting the camera module and the plural balls. The base is used for accommodating the carrier part. The driving module is used for driving movement of the carrier part. The driving module is located at a corner of the carrier part. The plural balls are located at other corners of the carrier part. The carrier part is guided by the plural balls to be moved in a direction parallel with an optical axis of the camera module.

15 Claims, 3 Drawing Sheets

ACTUATOR

FIELD OF THE INVENTION

The present invention relates to an actuator, and more particularly to an actuator for driving a lens module to perform a focusing operation.

BACKGROUND OF THE INVENTION

With increasing development of photographing technologies, portable electronic devices such as mobile phones or tablet computers are usually equipped with image pickup devices for capturing images. Moreover, most of the modern image pickup devices have focusing functions. By the focusing function, the object at different distances from the image pickup device can be clearly imaged into the image pickup device. In particular, by adjusting a position of a camera module 9 (see FIG. 1) of the image pickup device, the ambient light beam can be introduced into the image pickup device and accurately focused on a sensing element of the image pickup device. Consequently, the captured image can be clearly shown. Obviously, an actuator 1 (see FIG. 1) for driving the camera module 9 to perform a focusing operation is one important factor that influences the imaging quality.

FIG. 1 schematically illustrates a conventional actuator and a camera module to be driven by the actuator. The actuator and the camera module are disclosed in for example U.S. Pat. No. 8,049,971. As shown in FIG. 1, the actuator 1 comprises a piezoelectric driving unit 11, a carrier part 12, a base 13, and plural balls 14. The carrier part 12 is disposed within the base 13 for supporting the camera module 9. The piezoelectric driving unit 11 is contacted with a first side of the carrier part 12. The piezoelectric driving unit 11 is used for moving the carrier part 12 upwardly or downwardly in order to achieve the focusing function. The plural balls 14 are located at a second side of the carrier part 12, and clamped between the carrier part 12 and the base 13. When the carrier part 12 is moved by the piezoelectric driving unit 11, the plural balls 14 are rolled along an inner wall of the base 13. Consequently, the carrier part 12 is moved in a direction parallel with an optical axis 91 of the camera module 9. In such way, the carrier part 12 will not be aslant moved (e.g. in the direction indicated as the dotted line L of FIG. 1).

However, since one side of the carrier part 12 is supported by the piezoelectric driving unit 11 in a single-point contacting manner only, the stability of moving the carrier part 12 is not satisfied. Moreover, during the assembling process, the balls 14 and the carrier part 12 are respectively installed in the base 13. For fixing the balls 15 between the carrier part 12 and the base 13, the actuator 1 should be equipped with an additional component for fixing the balls 14. Under this circumstance, the complexity of the assembling process is increased.

From the above discussions, the conventional actuator 1 for driving the camera module 9 needs to be further improved.

SUMMARY OF THE INVENTION

An object of the present invention provides an actuator, in which the stability of moving a carrier part of the actuator is increased.

Another object of the present invention provides an actuator, in which a camera module and plural balls are simultaneously supported by a carrier part of the actuator.

In accordance with an aspect of the present invention, there is provided an actuator for driving a camera module to perform a focusing operation. The actuator includes a carrier part, a base, a driving module, and plural balls. The carrier part supports the camera module. The carrier part includes plural carrier sidewalls and plural carrier corners. Each of the plural carrier corners is located at a junction between every two adjacent carrier sidewalls. The base is used for accommodating the carrier part. The driving module includes a magnetic body and a magnetic coil. The magnetic body is disposed on the carrier part. The magnetic is disposed on the base, wherein the carrier part is driven to be moved by the driving module. The plural balls are arranged between the carrier part and the base. When the carrier part is moved, the carrier part is guided by the plural balls to be moved in a direction parallel with an optical axis of the camera module. The magnetic body is located at a specified carrier corner of the plural carrier corners. The plural balls are located at remaining carrier corners of the plural carrier corners.

In accordance with another aspect of the present invention, there is provided an actuator for driving a camera module to perform a focusing operation. The actuator includes a carrier part, a base, a driving module, and plural balls. The carrier part supports the camera module. The base is used for accommodating the carrier part. The driving module is used for driving the carrier part to be moved within the base. The plural balls are arranged between the carrier part and the base. When the carrier part is moved, the carrier part is guided by the plural balls to be moved in a direction parallel with an optical axis of the camera module. The carrier part includes plural ball receiving spaces. The plural balls are accommodated within corresponding ball receiving spaces.

The above objects and advantages of the present invention will become more readily apparent to those ordinarily skilled in the art after reviewing the following detailed description and accompanying drawings, in which:

DETAILED DESCRIPTION OF THE PREFERRED EMBODIMENT

Figure 1:
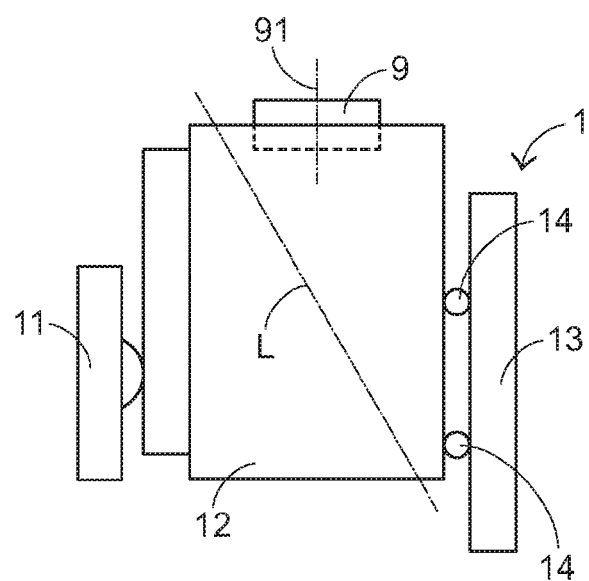
FIG. 1 schematically illustrates a conventional actuator and a camera module to be driven by the actuator.
Figure 2:
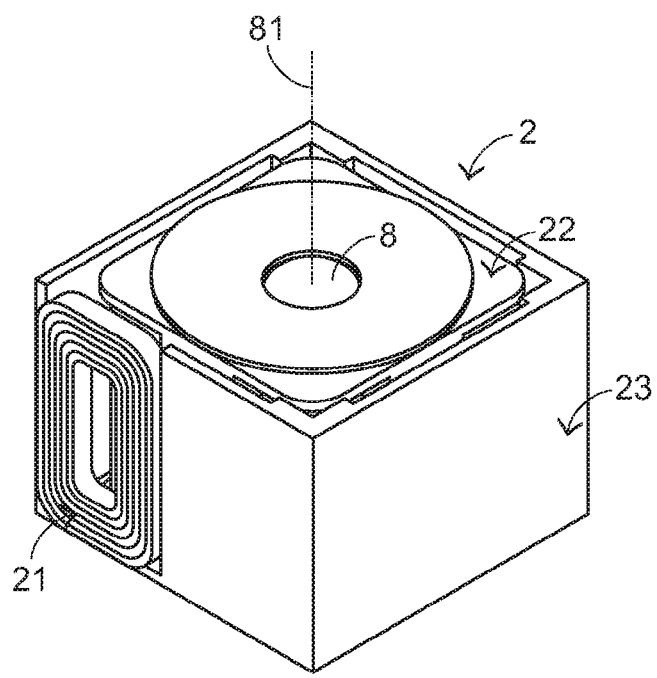
FIG. 2 is a schematic perspective view illustrating an actuator according to a first embodiment of the present invention.
Figure 3:
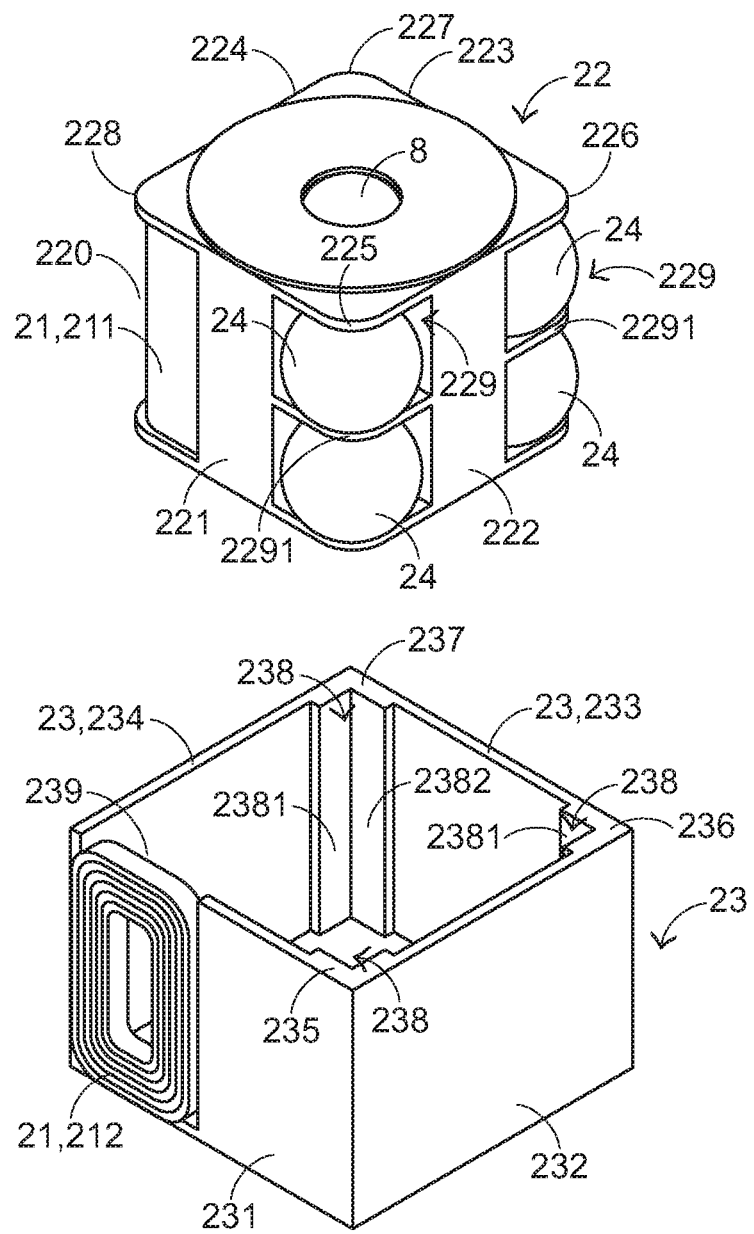
FIG. 3 is a schematic exploded view illustrating the actuator of FIG. 2.

FIG. 2 is a schematic perspective view illustrating an actuator according to a first embodiment of the present invention. FIG. 3 is a schematic exploded view illustrating the actuator of FIG. 2. Please refer to FIGS. 2 and 3. The actuator 2 is used for driving a camera module 8 to perform a focusing operation. The actuator 2 comprises a driving module 21, a carrier part 22, a base 23, and plural balls 24. The carrier part 22 is accommodated within the base 23. The driving module 21 is used for driving movement of the carrier part 22. The carrier part 22 is used for supporting the camera module 8. The plural balls 24 are arranged between the carrier part 22 and the base 23. When the carrier part 22 is moved, the carrier part 22 is guided by the plural balls 24 to be moved in a direction parallel with an optical axis 81 of the camera module 8.

In this embodiment, the driving module 21 is a magnetic driving module. Moreover, the driving module 21 comprises a magnetic body 211 and a magnetic coil 212. The magnetic body 211 is disposed on the carrier part 22. The magnetic coil 212 is disposed on the base 23. Moreover, both of the carrier part 22 and the base 23 have quadrilateral profiles. In this embodiment, the base 23 comprises a first base sidewall 231, a second base sidewall 232, a third base sidewall 233, and a fourth base sidewall 234. A first base corner 235 is located at the junction between the first base sidewall 231 and the second base sidewall 232. A second base corner 236 is located at the junction between the second base sidewall 232 and the third base sidewall 233. A third base corner 237 is located at the junction between the third base sidewall 233 and the fourth base sidewall 234. Moreover, three L-shaped guide grooves 238 that are in parallel with the optical axis 81 are formed at the first base corner 235, the second base corner 236 and the third base corner 237, respectively. Moreover, the first base sidewall 231 has a notch 239. The magnetic coil 212 is disposed and fixed in the notch 239.

The carrier part 22 comprises a first carrier sidewall 221, a second carrier sidewall 222, a third carrier sidewall 223, and a fourth carrier sidewall 224. A first carrier corner 225 is located at the junction between the first carrier sidewall 221 and the second carrier sidewall 222. A second carrier corner 226 is located at the junction between the second carrier sidewall 222 and the third carrier sidewall 223. A third carrier sidewall 227 is located at the junction between the third carrier sidewall 223 and the fourth carrier sidewall 224. A fourth carrier sidewall 228 is located at the junction between the first carrier sidewall 221 and the fourth carrier sidewall 224. Moreover, the first carrier corner 225, the second carrier corner 226, the third carrier sidewall 227 and the fourth carrier sidewall 228 are aligned with and located beside the first base corner 235, the second base corner 236, the third base corner 237 and the magnetic coil 212, respectively. Moreover, three ball receiving spaces 229 are internally concaved in the first carrier corner 225, the second carrier corner 226 and the third carrier sidewall 227 of the carrier part 22, respectively. The plural balls 24 are accommodated within the ball receiving spaces 229. Moreover, a magnetic body receiving space 220 is internally concaved in the fourth carrier sidewall 228 of the carrier part 22. The magnetic body 211 is accommodated and fixed within the magnetic body receiving space 220.

Consequently, the process of assembling the actuator 2 is simplified. Firstly, the magnetic body 211 is placed within the magnetic body receiving space 220 of the carrier part 22 and the plural balls 24 are placed within corresponding ball receiving spaces 229. Then, the carrier part 22 along with the magnetic body 211 and the plural balls 24 are placed within the base 23. In such way, the actuator 2 is assembled. When the carrier part 22 along with the magnetic body 211 and the plural balls 24 are placed within the base 23, each of the plural balls 24 is contacted with and sustained against two lateral surfaces 2381 and 2382 of the corresponding L-shaped guide groove 238. It is noted that numerous modifications and alterations may be made while retaining the teachings of the invention. For example, in some embodiments, a partition plate 2291 is disposed within each ball receiving space 229. Consequently, one ball 24 is accommodated and fixed within the region between the partition plate 2291 and a top side of the carrier part 22, and another ball 24 is accommodated and fixed within the region between the partition plate 2291 and a bottom side of the carrier part 22.

The actions of the actuator 2 will be illustrated as follows. When an electric current flows through the magnetic coil 212, a magnetic field is generated around the magnetic coil 212. The magnetic field may interact with the magnetic body 211, which is located near the magnetic coil 212 and disposed on the carrier part 22. Due to the interaction between the magnetic field and the magnetic body 211, the carrier part 22 is driven to be moved toward an outer side of the base 23 or moved toward an inner side of the base 23. With the movement of the carrier part 22, the camera module 8 supported by the carrier part 22 will be moved to an appropriate position. Consequently, a light beam passing through the camera module 8 can be focused on a predetermined position (e.g. a sensing element of an image pickup device) in order to implement the focusing operation. During the process of moving the carrier part 22, each of the plural balls 24 is rolled along the two surfaces 2381 and 2382 of the corresponding L-shaped guide groove 238. Since all of the L-shaped guide grooves 238 are in parallel with the optical axis 81, the carrier part 22 is limited to be moved in the direction parallel with the optical axis 81. In such way, the carrier part 22 will not be aslant moved.

From the above discussions about the actuator 2, the balls 24 for limiting the movable range of the carrier part 22 are arranged between plural corners of the carrier part 22 and the base 23. Consequently, the stability of moving the carrier part 22 is enhanced. Moreover, the carrier part 22 of the actuator 2 of the present invention has the functions of simultaneously supporting the camera module 8 and placing the balls 24. Under this circumstance, it is not necessary to install an additional component for fixing the balls 24, and thus the efficiency of assembling the actuator 2 is increased.

The actuator of the first embodiment is presented herein for purpose of illustration and description only. It is noted that numerous modifications and alterations may be made while retaining the teachings of the invention. For example, other type of the driving module (e.g. a piezoelectric driving module) may be used as the driving module 21 of the actuator of the present invention. Moreover, the base 23 and the carrier part 22 may have other polygonal profiles (e.g. triangular profiles or pentagonal profiles). Moreover, the number or the arrangement of the partition plates within each ball receiving space 229 may be varied according to the practical requirements. For example, in some other embodiments, two partition plates that are perpendicular to each other may be disposed within the ball receiving space 229. Consequently, four balls 24 are accommodated and fixed within each ball receiving space 229.

Figure 4:
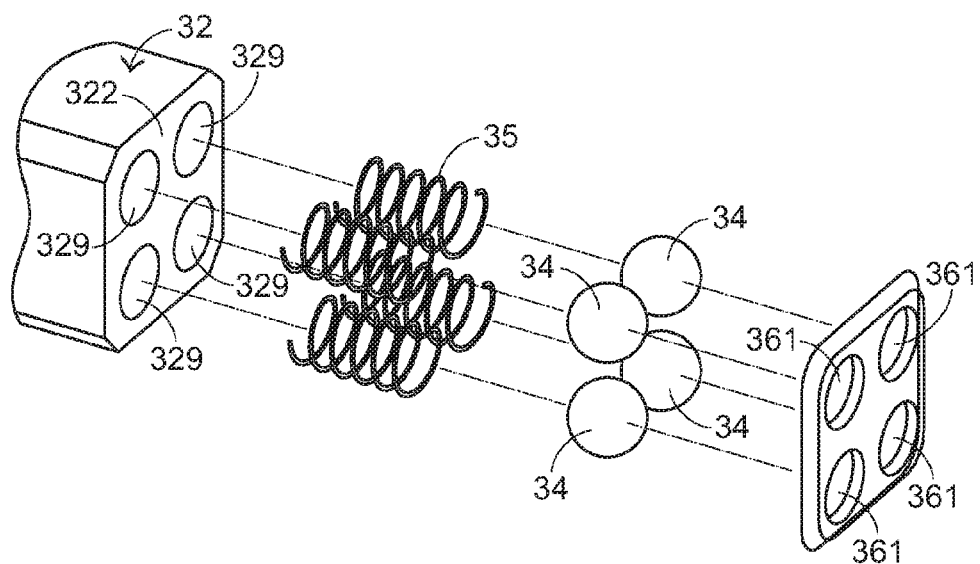
FIG. 4 is a schematic exploded view illustrating a portion of a carrier part of an actuator according to a second embodiment of the present invention.

FIG. 4 is a schematic exploded view illustrating a portion of a carrier part of an actuator according to a second embodiment of the present invention. For clarification and brevity, only a second carrier sidewall 322 of the carrier part 32 is shown in the drawing. The structures of the other carrier sidewalls (not shown) may be similar to the structure of the second carrier sidewall 322 according to the practical requirements. The functions of the components of the actuator of this embodiment are similar to those of the first embodiment, and are not redundantly described herein. For example, the carrier part 32 is capable of simultaneously supporting the camera module (not shown) and plural balls 34. The camera module is similar to that shown in FIG. 3.

In comparison with the actuator of the first embodiment, plural ball receiving spaces 329 are internally concaved in the second carrier sidewall 322 of the carrier part 32, and the carrier part 32 further comprises plural elastic elements 35 and a covering plate 36 with plural perforations 361. The plural perforations 361 are aligned with the plural ball receiving spaces 329, respectively. After the plural elastic elements 35 and the plural balls 34 are sequentially accommodated within the corresponding ball receiving spaces 329, the covering plate 36 is combined with the second carrier sidewall 322. Consequently, the plural elastic elements 35 provide elastic forces to the corresponding balls 34. In response to the elastic forces, the plural balls 34 are contacted with the covering plate 36 and partially exposed outside the perforations 361. During the process of moving the carrier part 32, the plural balls 34 are rolled along the second base sidewall (not shown) of the base (not shown). The structure of the second base sidewall of the base may be referred to FIG. 3. Consequently, the carrier part 32 is guided by the plural balls 34 to be moved in a direction parallel with the optical axis of the camera module (not shown). The optical axis of the camera module may be referred to FIG. 3.

While the invention has been described in terms of what is presently considered to be the most practical and preferred embodiments, it is to be understood that the invention needs not be limited to the disclosed embodiments. On the contrary, it is intended to cover various modifications and similar arrangements included within the spirit and scope of the appended claims which are to be accorded with the broadest interpretation so as to encompass all such modifications and similar structures.

What is claimed is:

1. An actuator for driving a camera module to perform a focusing operation, the actuator comprising:
    a carrier part supporting the camera module, wherein the carrier part comprises plural carrier sidewalls and plural carrier corners, wherein each of the plural carrier corners is located at a junction between every two adjacent carrier sidewalls;
    a base accommodating the carrier part;
    a driving module comprising a magnetic body and a magnetic coil, wherein the magnetic body is disposed on the carrier part, and the magnetic is disposed on the base, wherein the carrier part is driven to be moved by the driving module; and
    plural balls arranged between the carrier part and the base, wherein when the carrier part is moved, the carrier part is guided by the plural balls to be moved in a direction parallel with an optical axis of the camera module,
    wherein the magnetic body is located at a specified carrier corner of the plural carrier corners, and the plural balls are located at remaining carrier corners of the plural carrier corners.

2. The actuator according to claim 1, wherein a magnetic body receiving space is internally concaved in the specified carrier corner of the plural carrier corners of the carrier part, and the magnetic body is accommodated within the magnetic body receiving space.

3. The actuator according to claim 2, wherein the base comprises plural base sidewalls, and one of the plural base sidewalls corresponding to the magnetic body receiving space comprises a notch, wherein the magnetic coil is disposed and fixed in the notch.

4. The actuator according to claim 3, wherein plural ball receiving spaces are internally concaved in the remaining carrier corners of the plural carrier corners of the carrier part, respectively, wherein each of the ball receiving spaces accommodates at least one of the plural balls.

5. The actuator according to claim 4, wherein the base further comprises plural base corners corresponding to the plural ball receiving spaces, wherein each of the plural base corners is located at a junction between every two adjacent base sidewalls, wherein plural L-shaped guide grooves in parallel with the optical axis are formed at the plural base corners, respectively, wherein the at least one ball is contacted with two lateral surfaces of the corresponding L-shaped guide groove, so that the at least one ball is rolled along the corresponding L-shaped guide groove.

6. The actuator according to claim 4, wherein a partition plate is disposed within the corresponding ball receiving space, wherein one of the balls is accommodated within a region between the partition plate and a top side of the carrier part, and another ball is accommodated within a region between the partition plate and a bottom side of the carrier part.

7. The actuator according to claim 3, wherein both of the carrier part and the base have quadrilateral profiles.

8. An actuator for driving a camera module to perform a focusing operation, the actuator comprising:
    a carrier part supporting the camera module, wherein the carrier part comprises plural carrier sidewalls and plural carrier corners, wherein each of the plural carrier corners is located at a junction between every two adjacent carrier sidewalls;
    a base accommodating the carrier part;
    a driving module driving the carrier part to be moved within the base, wherein the driving module comprises a magnetic body and a magnetic coil, wherein the magnetic body is disposed on the carrier part, and the magnetic coil is disposed on the base; and
    plural balls arranged between the carrier part and the base, wherein when the carrier part is moved, the carrier part is guided by the plural balls to be moved in a direction parallel with an optical axis of the camera module,
    wherein the carrier part comprises plural ball receiving spaces, and the plural balls are accommodated within corresponding ball receiving spaces,
    wherein the magnetic body is located at a specified carrier corner of the plural carrier corners, and the plural balls are located at remaining carrier corners of the plural carrier corners.

9. The actuator according to claim 8, wherein a partition plate is disposed within the corresponding ball receiving space, wherein one of the balls is accommodated within a region between the partition plate and a top side of the carrier part, and another ball is accommodated within a region between the partition plate and a bottom side of the carrier part.

10. The actuator according to claim 8, wherein the plural ball receiving spaces are located at corresponding carrier corners, respectively.

11. The actuator according to claim 10, wherein the base further comprises plural base corners corresponding to the plural ball receiving spaces, wherein each of the plural base corners is located at a junction between every two adjacent base sidewalls, wherein plural L-shaped guide grooves in parallel with the optical axis are formed at the plural base corners, respectively, wherein the at least one ball is contacted with two lateral surfaces of the corresponding L-shaped guide groove, so that the at least one ball is rolled along the corresponding L-shaped guide groove.

12. The actuator according to claim 8, wherein a magnetic body receiving space is internally concaved in the specified carrier corner of the plural carrier corners of the carrier part, and the magnetic body is accommodated within the magnetic body receiving space.

13. The actuator according to claim 12, wherein the base comprises plural base sidewalls, and one of the plural base sidewalls corresponding to the magnetic body receiving space comprises a notch, wherein the magnetic coil is disposed and fixed in the notch.

14. The actuator according to claim 8, wherein both of the carrier part and the base have quadrilateral profiles.

15. The actuator according to claim 8, wherein the plural ball receiving spaces are internally concaved in at least one carrier sidewall of the plural carrier sidewalls, and the carrier part further comprises plural elastic elements and at least one covering plate, wherein the at least one covering plate comprises plural perforations corresponding to the plural ball receiving spaces, wherein after the plural elastic elements and the plural balls are sequentially accommodated within the corresponding ball receiving spaces, the at least one covering plate is combined with the at least one carrier sidewall, so that the plural elastic elements provide elastic forces to the corresponding balls, wherein in response to the elastic forces, the plural balls are contacted with the at least one covering plate and partially exposed outside the corresponding perforations.

* * * * *